A. ZEIDLER.
RADIUS AND CONTOUR CUTTING ATTACHMENT FOR GRINDING MACHINES.
APPLICATION FILED AUG. 30, 1917. RENEWED MAR. 15, 1919.
1,301,350.
Patented Apr. 22, 1919.
2 SHEETS—SHEET 1.
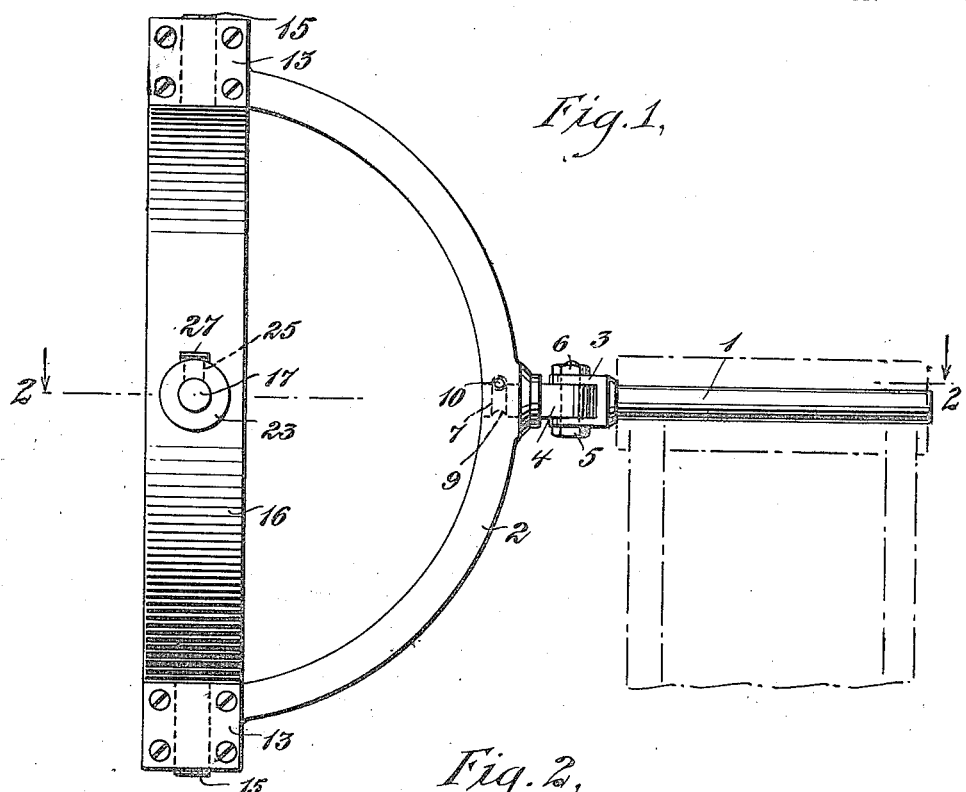

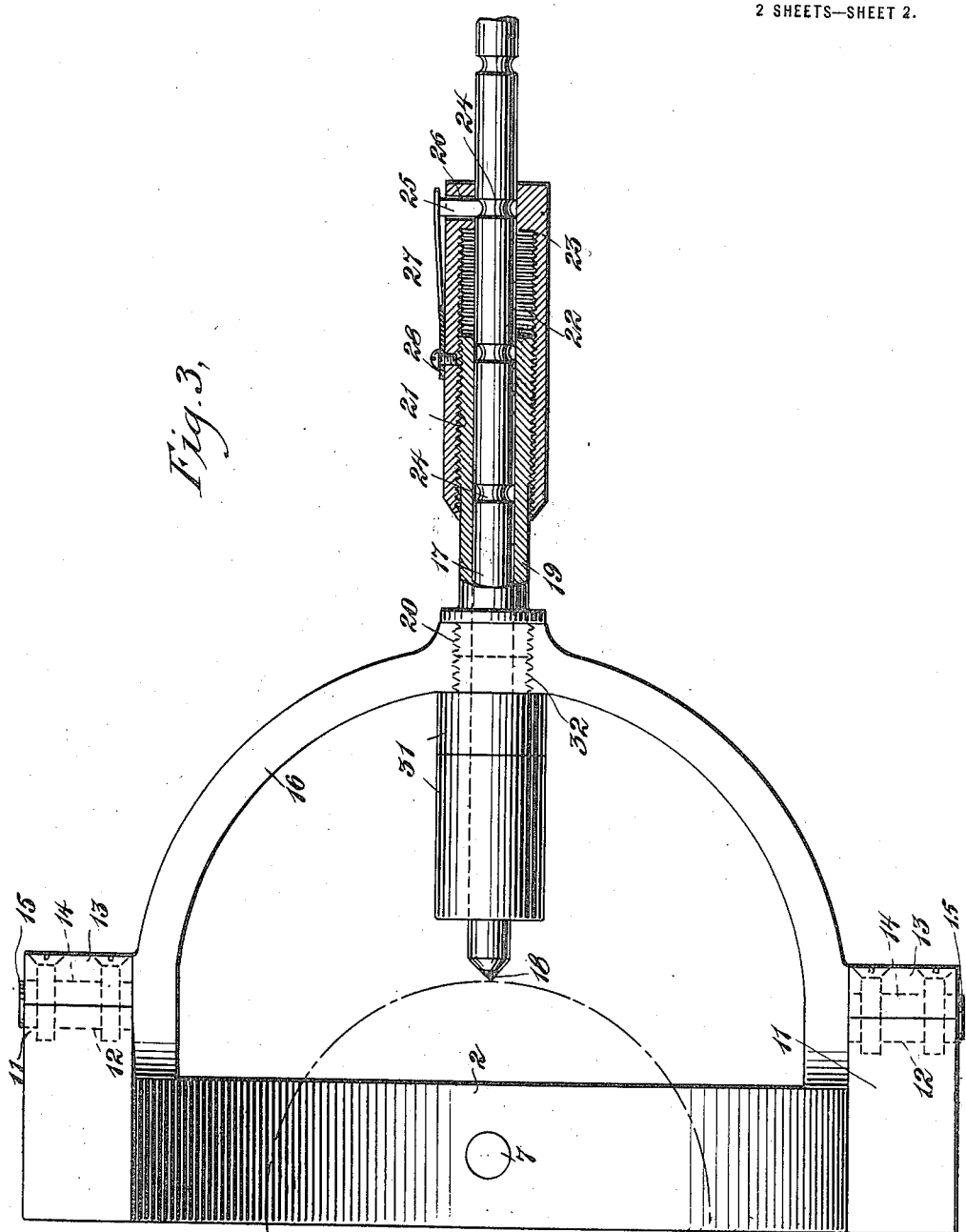

UNITED STATES PATENT OFFICE.

ARTHUR ZEIDLER, OF SPRINGFIELD, MASSACHUSETTS.

RADIUS AND CONTOUR CUTTING ATTACHMENT FOR GRINDING-MACHINES.

1,301,350.            Specification of Letters Patent.      Patented Apr. 22, 1919.

Application filed August 30, 1917, Serial No. 188,994. Renewed March 15, 1919. Serial No. 282,966.

*To all whom it may concern:*

Be it known that I, ARTHUR ZEIDLER, a citizen of the United States, and a resident of Springfield, in the county of Hampden and State of Massachusetts, have invented a new and Improved Radius and Contour Cutting Attachment for Grinding-Machines, of which the following is a full, clear, and exact description.

This invention relates to grinding machines and has to deal more particularly with an attachment for supporting the diamond or carbon point in such a manner that any desired contour can be cut in the emery or other grinding wheel.

The invention has for its general objects to improve and simplify the construction and operation of devices of this character so as to be reliable and efficient in use and comparatively simple and inexpensive to manufacture and so designed that almost an infinite variety of adjustments can be obtained for cutting concave, convex or compound contours.

A more specific object of the invention is the provision of a cutting device of the character referred to in which the diamond holding rod is so mounted as to provide for a quick coarse adjustment to operate on wheels of different radii and for fine micrometer adjustment without the use of a gage whereby very accurate work can be done.

Another object of the invention is to provide a universal adjustment between the stem or shank and the supporting frame to permit the diamond to be set for operation at any desired angle.

With such objects in view, and others, the invention comprises various novel features of construction and arrangement of parts which will be more fully set forth hereinafter taken in connection with the accompanying drawings, in which similar reference characters are employed to designate corresponding parts, and in which—

Figure 1 is a side view of the cutting attachment.

Fig. 2 is a horizontal section on the line 2—2 of Fig. 1; and

Fig. 3 is a plan view with portions in section.

Referring to the drawings, 1 indicates the stem or shank of the tool and 2 the semi-circular frame or holder. The stem 1 has bifurcations 3 between which extends a head 4, there being a bolt 5 passing through the bifurcations and head so as to constitute a hinge joint whereby the frame 2 can swing on an axis at right angles to that of the stem 1. After the desired angular adjustment of the frame 2 about the hinge is obtained the nut 6 can be tightened to clamp the frame in proper position. The head 4 has a stud 7 which enters a radial opening 8 in the frame 2 and in the stud is an annular groove 9 into which is adapted to engage a tapering locking pin 10 screwed into the frame 2 whereby the said frame can be clamped to the stud in any angular position around the stud as an axis. To adjust the frame around the stud the clamping pin or bolt 10 is first loosened and when the exact position is obtained the bolt is tightened. The outer extremities of the frame 2 have laterally extending lugs 11 formed with semi-cylindrical bearing surfaces 12 and attached to these lugs are cap pieces 13 having bearing recesses 14 whereby the lugs and cap pieces form bearings for the pivots 15 of the cutter carrying yoke 16. The yoke 16 is semi-circular and swings on an axis at right angles to the shank or stem 11 and to one side of the plane thereof so that the yoke 16 can swing through a wide angle without the frame 2 interfering, whereby it is possible to trim a grinding wheel with a full semi-circular contour either concave or convex. Passing through the center of the yoke 16 is a rod 17 which has a diamond or other cutting point 18. This rod 17 is slidable longitudinally in a barrel 19 which is screwed into the yoke 16 at 20. The barrel 19 has external threads 21 with which engage the internal threads 22 of a thimble 23, the latter having a detachable engagement with the rod 17 so that by turning the thimble the rod can be moved longitudinally for fine and accurate adjustment. The rod 17 has circumferential grooves 24 spaced preferably an inch apart and a pin 25 extends through an opening 26 in the thimble 23 and engages in one of the grooves 24 whereby the turning of the thimble will cause the pin 25 to move the diamond carrying rod 17 longitudinally. Preferably the pin 25 is carried by a leaf spring 27 fastened at 28 on the thimble. By engaging the free end of the spring by the thumb, the pin can be pulled outwardly and so held while the rod 17 is adjusted inwardly or outwardly according to the diameter of the wheel that is being dressed or cut. To facilitate fine adjustment micrometer scales 29 and 30 are arranged on the barrel 19 and thimble 23 respectively as shown in Fig. 2.

To prevent chattering of the diamond 18, when small wheels are being operated on, steady sleeves 31 are assembled on that portion of the rod 17 lying between the work and the yoke 16. The outermost sleeve screws into the yoke 16 at 32 and each sleeve has a threaded connection 33 with the adjacent one.

From the foregoing description, taken in connection with the accompanying drawings, the advantages of the construction and method of operation will be readily apparent to those skilled in the art to which the invention pertains, and while I have described the principle of operation of the invention together with the apparatus which I now consider to be the best embodiment thereof, I desire to have it understood that the device shown is merely illustrative and that such changes may be made when desired as are within the scope of the appended claim.

I claim:

In a cutting attachment for grinding machines comprising a movable support, a cutter carrying rod passing through the support, and a plurality of detachably connected sleeves surrounding the portion of the rod between the support and the cutting extremity, one of the sleeves being detachably connected with the support.

ARTHUR ZEIDLER.

Witnesses:
ELSIE TAYLOR,
PAULINE R. GOTSCH.